United States Patent
Hall

[19]

[11] Patent Number: 5,996,702
[45] Date of Patent: Dec. 7, 1999

[54] SYSTEM FOR MONITORING MOVEMENT OF A VEHICLE TOOL

[75] Inventor: David John Hall, Toowoomba, Australia

[73] Assignee: David Hall, Toowoomba, Australia

[21] Appl. No.: 08/981,479

[22] PCT Filed: Jun. 28, 1996

[86] PCT No.: PCT/AU96/00408

§ 371 Date: Dec. 29, 1997

§ 102(e) Date: Dec. 29, 1997

[87] PCT Pub. No.: WO97/01804

PCT Pub. Date: Jan. 16, 1997

[30] Foreign Application Priority Data

Jun. 29, 1995 [AU] Australia ................................ PN3851

[51] Int. Cl.$^6$ .............................. G05D 3/00; G05B 17/02
[52] U.S. Cl. ................................................. 172/4.5; 701/50
[58] Field of Search .................................. 172/2, 3, 4, 4.5, 172/7; 701/50

[56] References Cited

U.S. PATENT DOCUMENTS

| | | | |
|---|---|---|---|
| 4,630,773 | 12/1986 | Ortlip | 239/1 |
| 4,826,391 | 5/1989 | Lawrence et al. | 414/698 |
| 5,100,229 | 3/1992 | Lundberg et al. | 172/4.5 X |
| 5,174,385 | 12/1992 | Shinbo et al. | 172/4.5 |
| 5,220,876 | 6/1993 | Monson et al. | 111/130 |
| 5,375,663 | 12/1994 | Teach | 172/4.5 |
| 5,493,494 | 2/1996 | Henderson | 701/50 |
| 5,553,407 | 9/1996 | Stump | 701/50 X |
| 5,631,658 | 5/1997 | Gudat et al. | 701/50 X |
| 5,696,675 | 12/1997 | Nakamura et al. | 701/50 |
| 5,699,281 | 12/1997 | Crucius et al. | 701/50 X |
| 5,721,685 | 2/1998 | Holland et al. | 701/50 X |
| 5,751,576 | 5/1998 | Monson | 701/50 X |
| 5,806,016 | 9/1998 | Henderson et al. | 701/50 X |
| 5,854,988 | 12/1998 | Davidson et al. | 701/50 |

FOREIGN PATENT DOCUMENTS

| | | |
|---|---|---|
| 2018472 | 10/1979 | United Kingdom . |
| 2120074 | 11/1983 | United Kingdom . |
| WO90/01265 | 2/1990 | WIPO . |

*Primary Examiner*—Christopher J. Novosad
*Attorney, Agent, or Firm*—Jacobson, Price, Holman & Stern, PLLC

[57] ABSTRACT

A method for monitoring a vehicle tool including inputting tool data indicative of the location of the vehicle tool to a data processor, inputting data to the data processor on a topography model in which the vehicle tool is to operate, operating the data processing to compare the vehicle tool location with the model, outputting from the data processor to a visual display, data indicative of the difference in location between the vehicle tool and an adjacent surface of the model, displaying on the visual display an image of the topography model, a representation of the location of the vehicle tool and a representation of the distance of the vehicle tool to the adjacent surface of the model.

22 Claims, 5 Drawing Sheets

SYSTEM FOR MONITORING MOVEMENT OF A VEHICLE TOOL

FIELD OF THE INVENTION

The present invention is particularly applicable to earth moving activities such as those relating to open cut mining.

BACKGROUND OF THE INVENTION

Typically before any earth moving operation can commence the terrain to be excavated must be surveyed. Drawings can then be produced showing the existing topographical profile of the terrain and a desired profile of the terrain after excavation has been completed.

If the excavation requires bulldozers the bulldozer driver must continually consult drawings to determine how the earth moving activity is progressing and how close the current terrain profile is to the desired terrain profile. To assist in this regard physical markers can also be located on site and can be re-located as earth moving progresses.

The disadvantage with the above system is that the terrain must be continually surveyed to determine the difference between the current terrain profile and the desired terrain profile.

Because of the inefficiencies associated with the above conventional earth moving systems it would be desirable to produce a system which monitored the operation of earth moving vehicles to provide each driver with up-to-date information on the current status of the terrain profile being excavated.

SUMMARY OF THE INVENTION

The present invention in one aspect provides a method for monitoring a vehicle tool comprising inputting tool data indicative of the location of the vehicle tool to a data processor, inputting model data to the data processor on a model zone in which the vehicle tool is to operate, operating the data processor to compare the vehicle tool location with the model zone, outputting from the data processor to a display means, data indicative of the difference in location between at least a portion of the vehicle tool and an adjacent surface of the model zone, displaying on the display means an image of the model zone, a representation of the location of the vehicle tool and a representation of the distance of a part of the vehicle tool to the adjacent surface of the model zone.

Preferably the at least a portion of the vehicle tool in one embodiment is the whole of the vehicle tool.

Alternatively the part of the vehicle tool is the bottom edge of the working tool or/and the side edge of the vehicle tool.

Preferably the model zone represents the desired end result after re-shaping by the vehicle tool.

Preferably, the representation of the distance between the part of the vehicle tool and the adjacent surface comprises an image representing a shadow of the part of the vehicle tool on the adjacent surface.

Preferably, the part of the vehicle tool comprises the bottom of the vehicle tool.

It is preferred that the model data comprises a plurality of co-ordinate points referenced to a three dimensional co-ordinate system.

The tool data preferably comprises co-ordinates of at least a part of the vehicle tool in the three dimensional co-ordinate system.

The tool data may comprise data on the location of a point on the body of the vehicle separate from the vehicle tool.

The tool data may include data indicative of points on the vehicle tool.

The model data may comprise a plurality of points of a zone.

Co-ordinate points of the model zone may be stored in a memory of the data processor.

Preferably, the model zone is stored in memory as a grid of points.

Preferably the tool data includes vehicle data on the location of a vehicle to which the vehicle tool is attached.

The vehicle data may include data on the location of the vehicle relative to a reference point.

Preferably, the tool data is referenced to the vehicle location.

The vehicle tool shadow may be produced from a projection of the location of the vehicle tool vertically to the adjacent surface.

Preferably, the method includes the steps of tracking the location of the vehicle tool using a tracking means and relaying tool data to the data processor.

Preferably, the method includes locating the data processor and display means in the vehicle.

According to another embodiment of the present invention the method includes processing input tool data over a pre-determined period to produce path data on a path travelled by the vehicle tool, comparing the path data with the model zone data, producing revised model zone data, outputting the revised model zone data to the display means, displaying on the display means a revised model zone including a representation of a modification to the part of the model zone corresponding to the path travelled by the vehicle tool.

Preferably, vertical distances between the revised model zone and the desired model zone can be represented on the model zone.

Preferably, these distances can be indicated by variations of colour on the desired model zone.

Preferably, the revised model zone data is produced by comparing the path data with shadow data, which includes data on the distance the vehicle tool extends above or below the adjacent surface over a pre-determined period.

The method may include calculating the volume of space above or below the part of the model zone corresponding to the path travelled by the vehicle tool over the pre-determined period.

The method may include processing the calculated volume of space with parameters relating to the material filling the volume of space to produce an estimate of the resultant profile of the model zone effected by movement of the vehicle tool over the pre-determined period.

Preferably, the parameters relating to the material filling the volume of space include viscosity and density and angle of repose.

The method may include processing the calculated volume of space with parameters relating to the material filling the volume of space to provide an estimate of the location of the material at the end of the pre-determined period and an estimate of the resultant profile of the model zone.

Preferably, the method includes continuously displaying the revised model.

The method may include repeating the previous steps for a plurality of pre-determined periods.

The tool data preferably includes data on the angle of the tool with respect to a reference point.

Preferably, the reference point is on the vehicle.

Alternatively, the reference point is a fixed point in the model system.

According to another embodiment of the present invention the model zone data is processed to produce future path data which is output to the display means, which is arranged to display on the image of the model zone an indication of the path a vehicle tool should follow to complete an operation.

Preferably, the display means shows the indication of the path a vehicle tool should follow by a pointer.

The pointer may be an arrow.

The future path data may comprise information on the most cost effective path for the vehicle tool to take during an operation.

The method may comprise a step of operating the data processor using an optimisation algorithm to calculate the future path.

The method may comprise comparing model zone data at one time with model zone data at a later time to produce the future path.

Preferably, the model zone comprises a surface model of a terrain or a boundary of an ore body.

The surface model may comprise a grid pattern representing points of the landscape depicted by the surface model.

Preferably, the method includes calculating the volume of a solid bounded by the surface model at regular time intervals, calculating the difference in volumes between solids bounded by consecutive surface models and displaying a representation of the difference in volumes between consecutive surface models.

Preferably, the volume of the solid calculated is subdivided into a plurality of blocks.

Preferably, the plurality of blocks are defined by grids in the surface model.

The solid bounded by the surface model may be divided into a plurality of volume blocks.

Preferably the method includes displaying an image of the plurality of volume blocks on the display means.

The method preferably includes determining which volume block should be moved to which volume space on the surface model.

Preferably, each volume space is formed from co-ordinates in the co-ordinate system which do not represent the location of material and therefore lie above the surface model.

Preferably the display means displays a pointer from a block to an end location on the surface model.

According to another embodiment of the present invention the vehicle tool is the blade of a bulldozer.

Preferably the tool data comprises signals representing points on the vehicle tool.

The tool data may comprise signals representing points on the blade.

The vehicle tool may be an arm with an excavator bucket on one end.

Preferably the points on the vehicle tool permit the data processor to output to the display means data on the shape of the vehicle tool.

Preferably, the display means displays a profile of the vehicle tool.

Preferably, the display means displays an image of a blade of a bulldozer.

Preferably, the shadow is displayed on the display means as a projection of the bottom surface of the vehicle tool.

Preferably, if the lower surface of the vehicle tool is in contact with the adjacent surface, the image of the shadow is co-incident with the image of the lower surface of the vehicle tool.

According, to one embodiment the display means comprises two screen images, a first screen image displaying the image of the model zone, the image of the vehicle tool and the representation of the shadow and the second screen showing the image of the revised model zone.

Preferably, the display means comprising the third screen shows an image of the model zone prior to change by the vehicle tool.

According to a further embodiment of the present invention the display means displays an image the model zone prior to a work operation by the vehicle tool, an image of a desired model zone after completion of a working operation by the vehicle tool, an image of the current appearance of the model zone at any particular point in time, an image of the vehicle tool and an image of the shadow of the vehicle tool.

Preferably, the display means includes a representation of path data on any one of the model zones.

Preferably each image of one of the model zones is represented by a grid pattern appearing as a three dimensional display.

Preferably the image of the vehicle tool and the image of the shadow are continuously displayed during movement of the vehicle tool.

Preferably, the vehicle comprises indicators to provide an indication of when the vehicle tool passes below the surface of the desired model zone.

Preferably the display means displays an indicator whenever a part of the image of the shadow passes through any part of the image of the vehicle tool.

Preferably the indicator is an audible alarm.

According to another aspect of the present invention a system is provided for monitoring movement of a vehicle tool in a model zone comprising a position indicator for indicating the location of a vehicle tool, an orientation indicator for indicating the orientation of the vehicle tool, a tracking means for tracking the position indicator and orientation indicator, a tracking means for transmitting signals indicative of the location of the vehicle tool and the orientation of the vehicle tool, a display means for location on the vehicle for the vehicle tool, wherein the display means is arranged to display a representation of the vehicle tool in the model zone and a representation of the shadow of the vehicle tool cast on the model zone, a data processor for receiving signals transmitted by the tracker means and for processing the signals with data representing a model zone for outputting data to the display means which data enables the display means to display a representation of the vehicle tool and image of the model zone and a representation of a shadow cast by the vehicle tool on the model zone.

According to another aspect of the present invention a system is provided for monitoring movement of a vehicle tool in a model zone, comprising a data processor to be used to receive signals representing the location of a vehicle tool to process data relating to a model zone in which the vehicle tool is to operate and to output to a display means data representing an image of the model zone, data representing location of the vehicle tool within the model zone at any time and data representing an image of the distance between the vehicle tool and an adjacent portion of the model zone, a display to be located in the vehicle of the vehicle tool for displaying image data received from the data processor, a tracking means for tracking the location of parts of the vehicle tool and wherein the tracking means monitors the location of the vehicle tool, sends signals representing the location of the vehicle tool to the data processor and the display displays an image of the vehicle tool, an image of the model zone and the image of the distance between the vehicle tool and the adjacent portion of the model zone.

It is preferred that the system includes at least one indicator located on the vehicle for indicating the location of the vehicle tool.

Preferably the display means comprises a screen located in a control station.

At least one indicator preferably indicates the location of the vehicle tool in a three dimensional co-ordinate system.

Preferably each indicator is located on a part of the vehicle tool.

Preferably at least one indicator is located on the vehicle separate from the vehicle tool.

Each indicator preferably represents a co-ordinate in the reference co-ordinate system.

The model zone may be formed in the reference co-ordinate system.

Preferably a reference indicator is located on the vehicle.

The data processor preferably processes received signals representing the location of the vehicle tool to establish image data representing the shape and position of the vehicle tool.

The indicators may comprise a pitch tilt meter, a roll tilt meters and a bearing compass or inertia sensing transducers.

The tracking means preferably comprises a tracking theodolite.

One of the indicators may be located above the vehicle.

At least one indicator comprises a reflector which is arranged to be visible to the tracking means.

It is preferred that the indicator comprises six reflecting prisms each with a 60° field of view.

Preferably the data processor is located on the vehicle.

Preferably indicators are located on the vehicle tool.

Preferably the indicators located on the vehicle tool comprise targets for the tracking means.

Preferably the tracking means comprises a laser and transmitter.

The model zone may comprise a model terrain.

Preferably the model zone comprises reference indicators for establishing a frame of reference for the model zone and vehicle tool.

Preferably three locations on the tool are indicated by separate indicators.

Preferably the data processor is connected to a receiver.

Preferably the tracking means is located in a position where it is always visible to one indicator of the vehicle.

BRIEF DESCRIPTION OF THE DRAWINGS

A preferred embodiment of the present invention will now be described by way of example only with reference to the accompanying drawings in which.

DESCRIPTION OF THE PREFERRED EMBODIMENTS

A preferred embodiment of the invention will now be described for a bulldozer which is used to rehabilitate an open cut mine site. In such an application surveying techniques are used to develop a digital terrain model which can be visualised on an electronic display in the cabin of the bulldozer. A new tracking system is utilised so that the driver of the bulldozer can observe an image of the blade of the bulldozer in real time with reference to the terrain model appearing on the display screen.

According to the first embodiment a computer is located somewhere on the bulldozer and the display screen is located in the bulldozer cabin. A tracking theodolite with associated power supply is located at a point in the mine where there is always a clear line of sight to a bulldozer performing a bulldozing operation.

A target is located at points on the bulldozer blade and a flux gate compass (electronic compass) is located on the bulldozer. Two tilt meters are located on the bulldozer blade and electronic hardware is utilised to convert the signals received from the compass and tilt meters to a digital RS232 signal.

A radio modem is then provided in the bulldozer and at the theodolite.

The tracking theodolite uses servo motors to follow a moving target and it is preferred that tracking is performed on vehicles in the range of between 50 and 500 meters. Typically in tracking mode the system calculates the position of a vehicle every 0.6 seconds.

The tracking theodolite is aimed at targets which respectively reflect back signals for processing and transmission to the computer. The targets can therefore be mirrors or prisms.

Figure 1:
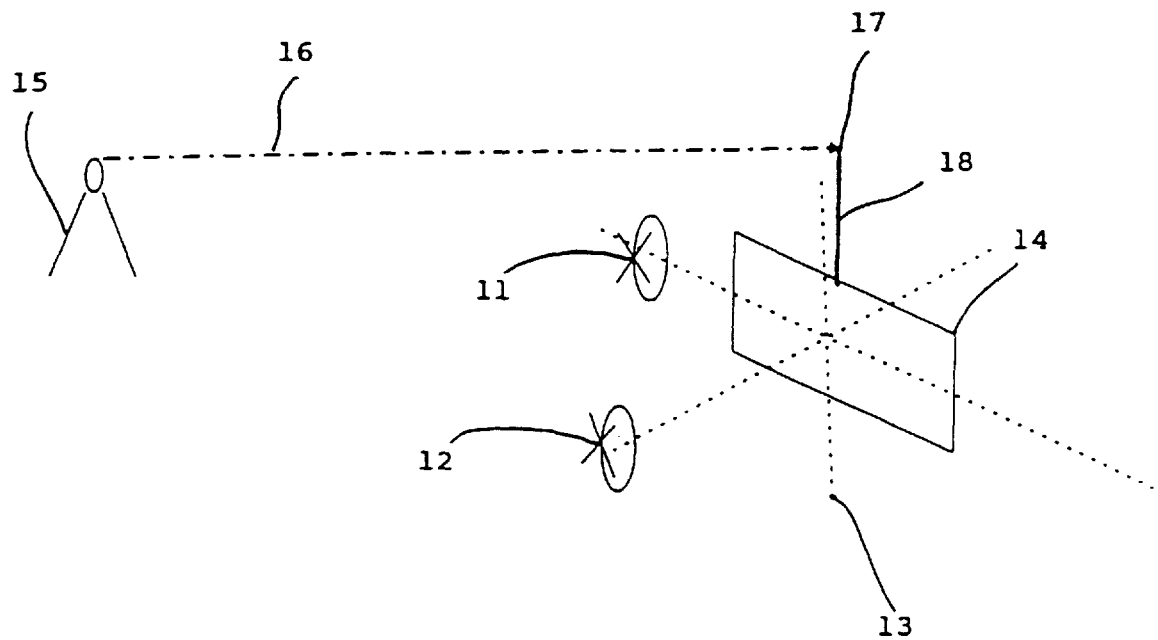
FIG. 1 shows a first embodiment of a system for monitoring movement of a blade of a bulldozer.

The flux gate compass is an electronic compass that determines north by reading the voltage generated by a magnetic flux in relation to the earths magnetic flux. Analogue signals are produced by she compass and timed digital signals produced by the tilt gauges are combined by conversion electronics into a combined positional message that is transmitted to the computer via appropriate cabling. The conversion electronics also converts the position of the edges of the blade to x, y, z co-ordinates relative to the target. As shown in FIG. 1 this requires two tilt meters 11 and 12 and one compass bearing 13.

Figure 9:
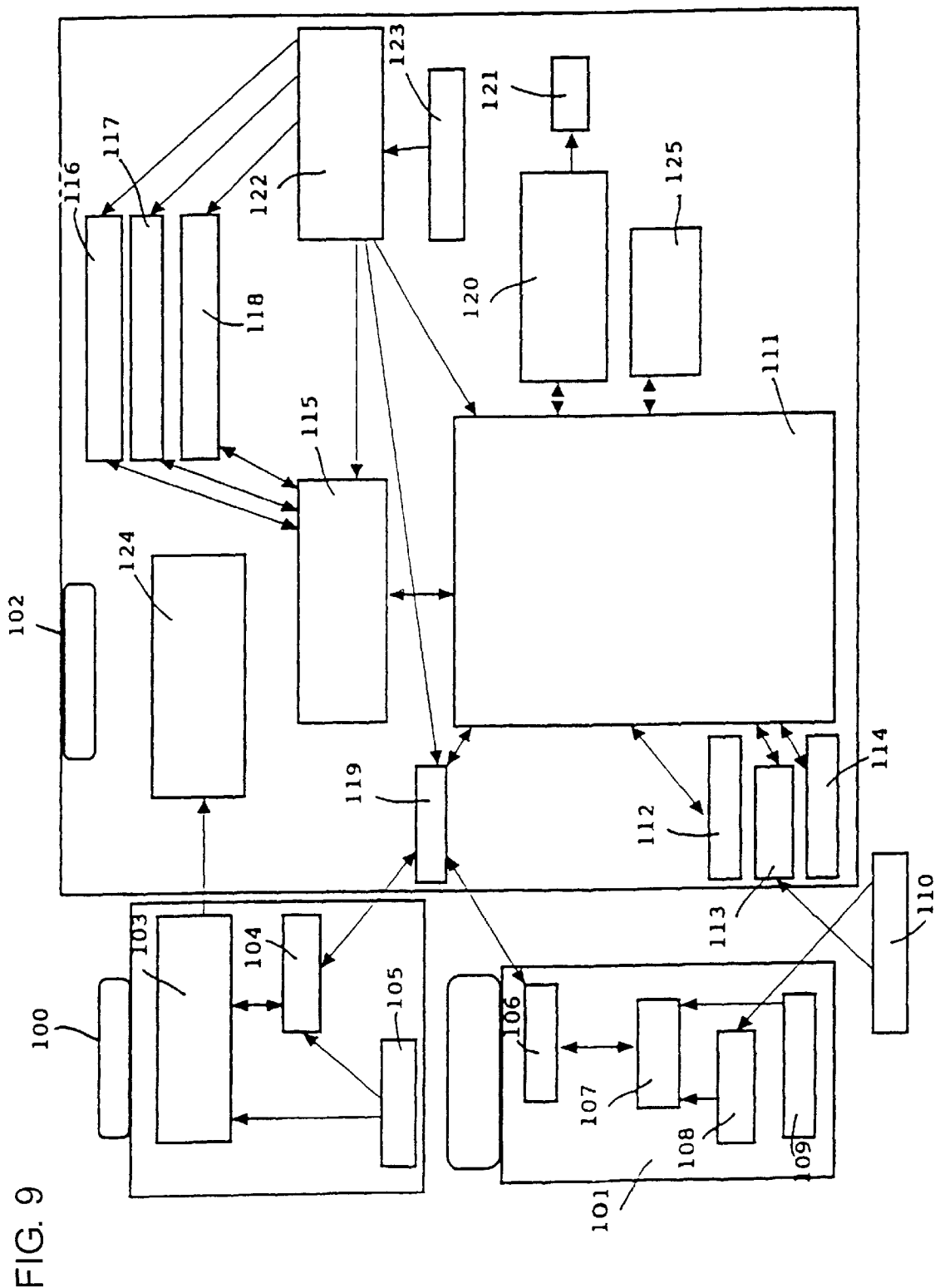
FIG. 9 shows a schematic diagram of the tracking station remote management station and bulldozer system of the present invention.

A schematic diagram of one version of the overall system is shown in FIG. 9.

The system incorporates a tracking station 100, a remote management station 101 and a bulldozer system 102. The tracking station consists of a tracking theodolite 103 for supplying an x, y, z co-ordinate to the main commuter processor, a digital radio 104 and a power supply 105.

The remote management station incorporates a digital radio 106 connected to a computer 107 which is operated by design software 108 and procedural software 109. Input survey data and design data 110 is used to formulate the design software.

The bulldozer system 102 consists of an onboard computer processor 111 with microprocessing software 112, design software 113 and procedural software 114. The computer processor 111 is connected to a microprocessor 115 consisting a multiplex single chip computer which receives data from x, y, z sensors 116, 117, 118 and relays digital data to the main computer 111. In this embodiment the x and y axis are measured by a tilt meter and the z axis by an electronic flush gate compass.

A digital radio 119 communicates with the onboard computer processor 111 and the digital radios 104 and 106 of the tracking station and remote management station respectively. The computer processor 111 utilises 3D viewing software of a shaded prospective image of a surface model with blade and blade shadow as represented by block 120 and this image is displayed on a screen 121.

A system power supply 122 provides the power needs of the sensors 116, 117, 118, the microprocessor 115, the digital radio 119, the onboard computer processor 111 and is connected to 24 volts bulldozer batteries.

In operation the computer processor sends signals to the microprocessor 115 to read data from sensors 116, 117, 118. The microprocessor 115 then sends information back to the computer processor 111 with relevant data.

The computer processor 111 then sends signals to the tracking theodolite via digital radios 119 and 104 to read co-ordinates of prisms 124 located on the bulldozer. This reflective prism is an array of six prisms in a circle so that at least any one prism is visible to the tracking theodolite at any time. The co-ordinates of the prisms are relayed back to the computer and the commuter processor calculates the blade points from data received from the tracking theodolite 103 and microprocessor 115. The processor 111 then combines the blade points on the terrain model from the 3D viewing software. The distance between the blade points and the surface of the terrain model is then calculated and projected downward to the surface model where the shadow is formed in accordance with the description provided hereinafter. A keyboard 125 is used to operate the computer processor 111.

In operation a bulldozer with a blade 14 moves over terrain (not shown). The tracking theodolite 15 is levelled typically at a high point of the job site and its laser is switched on. A frame of reference is effectively established by the theodolite dependent only upon where this happens to be pointing when it is switched on for example along line 16. This effectively becomes the x-axis for the theodolite's co-ordinate system.

With the x-axis established a co-ordinate system can be set up with the y-axis in the horizontal plane and the z-axis vertical and orthogonal to the horizontal plane formed by the x and y axes. The theodolite references itself in space at co-ordinate 00,00,00 and measures distance and angles from this reference point which can be converted into x, y and z co-ordinates at the measured point. This co-ordinate system is completely independent of any other co-ordinate system or global reference system.

Figure 4:
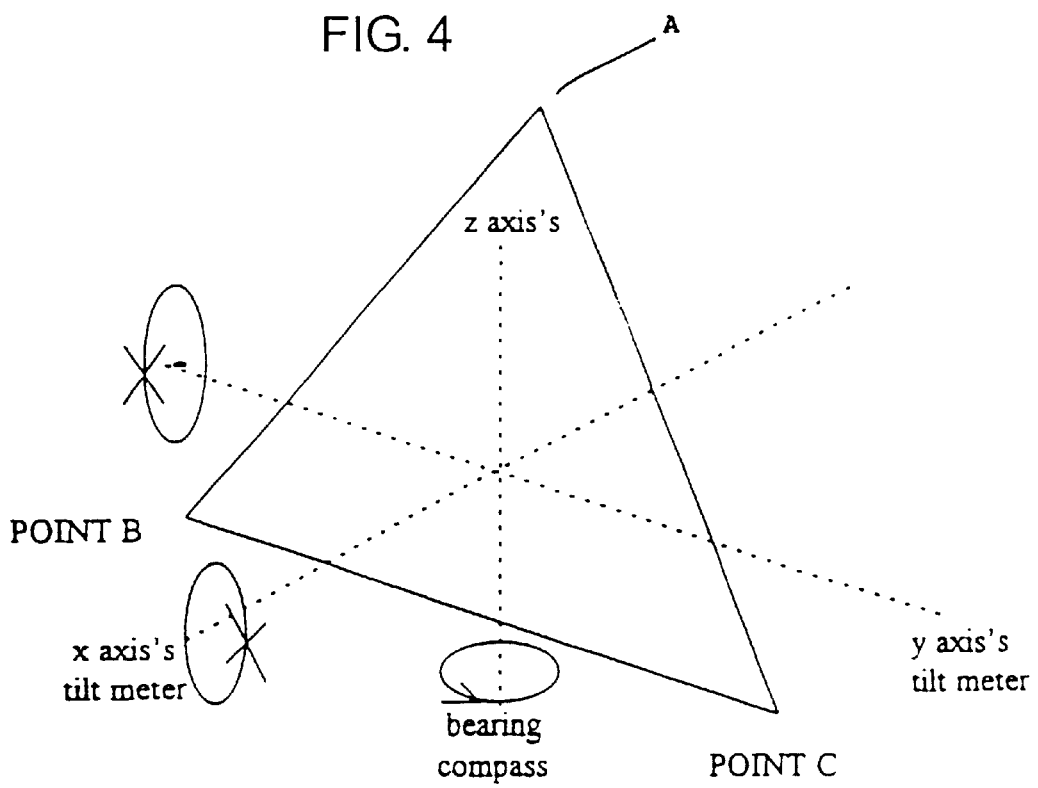
FIG. 4 shows a schematic of a co-ordinate system for the blade shown in FIG. 2.

The position of the reflector 17 shown as point A in FIG. 4 is measured by the theodolite and radioed to the computer in the cabin of the bulldozer. During setup a second reflector conveniently attached to the end of a pole is held at some position B away from A such as on the corner of the bulldozer blade and the co-ordinates of this point are read into the theodolite and transmitted to the computer. The process is repeated at another point C at the other end of the blade. The theodolite has thus recorded the x, y and z positions of three points of a triangle and the computer processes these points to establish a plane A, B, C defined with respect to the theodolites origin and co-ordinate system. It should be noted that a plane could be generated and defied in software from point A only by taking a reading from some other source such as the compass on board the bulldozer.

A second co-ordinate system can be defined with the origin of co-ordinates at point A and then the x-axis perpendicular to the plane the y-axis horizontal and the z-axis orthogonal to the other two. Such a co-ordinate system can be chosen to describe the system but it is irrelevant if this is the logic used. What is important is that the system can now convert the co-ordinates relevant to the theodolites axis system to the axis system associated with the plane A, B, C.

With the tilt meters 11, 12 and the compass 13 calibrated any rotation about one of the axes will also rotate the plane A, B, C along the same axis.

As the bulldozer moves the theodolite using the reflector 17 on the pole 18 tracks point A and using a radio link continually transmits to the computer the range and bearing of A referenced to the theodolite's position and orientation. The changes in orientation of the blade are sensed by transducers and continually transmitted to the computer. These rotations, with processing, can be assigned to the plane ABC establishing the orientation of the co-ordinate system at A. The position of the four (six or seven) points defining the blade profile remain fixed in this co-ordinate system. The computer can then be operated to establish the location and size of the blade using standard mathematical techniques.

During the set up process data is radioed from the theodolite to the computer on board the bulldozer so that the computer holds this co-ordinate data. The blade profile is established by moving a reflector (which the theodolite is tracking) to prominent points on its periphery and logging these points into the computer via the radio link. Software then constructs lines between these points to create a profile drawing of the blade. Previously logged points B and C, if on the blade, may be used in this process. The computer is then operated to calculate the position of the blade with respect to at point A and draws the blade flat on the computer screen. The images thus viewed on the screen bear no relationship with any external topography at this stage.

By surveying the mine site a topographical model can be devised and loaded into the computer. The model preferably contains two or more points that can be identified both on the computer model and in the field (for example by surveyors pegs). Reflectors are placed at these pegs and the co-ordinate data to them from the theodolite is logged and transmitted to the commuter. The position in real space from the surveyors data is entered into the computer. The computer now contains the real position of these points and their relative position as measured by the theodolite and can thus calculate the true position of the theodolite. A check on the relative positions of these reference points can now be made as the surveyors data can be checked against the theodolite data. At this point all previous data that was relative to the theodolites axis system is converted and reference to a true global axis system. Thus the reference triangular frame shown in FIG. 4 can be referenced to a true global axis system.

Figure 3:
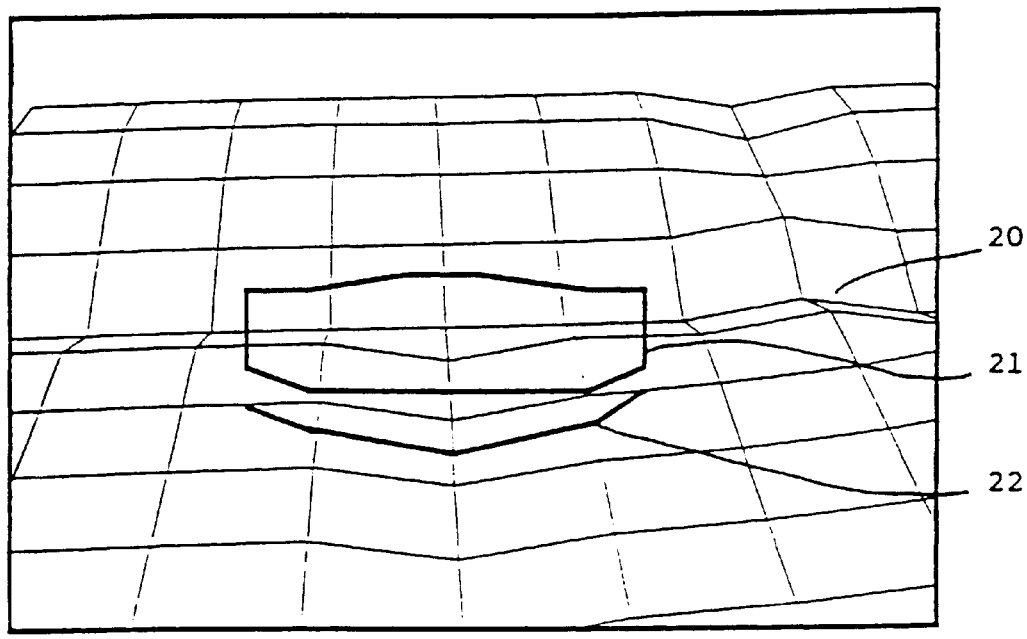
FIG. 3 shows a driver display of a bulldozer blade in a mine rehabilitation model.

As shown in FIG. 3 a terrain model 20 can be represented on the computer screen. Likewise the position of the bulldozer blade 21 can be positioned in real space in relation to the level of the terrain of model 20. Because the position of the bulldozer blade and the level of the terrain model at the blade are both known the computer can be programmed to calculate the distance between the two vertically. As a result a shadow 22 of the blade on the terrain model can be imaged on the computer screen. The computer screen thus shows an accurate representation of the distance of the blade 21 above the top surface of the terrain 22. The closer the bottom of the blade to the shadow 22 the closer the blade is to the top surface of the terrain 20.

Figure 2:
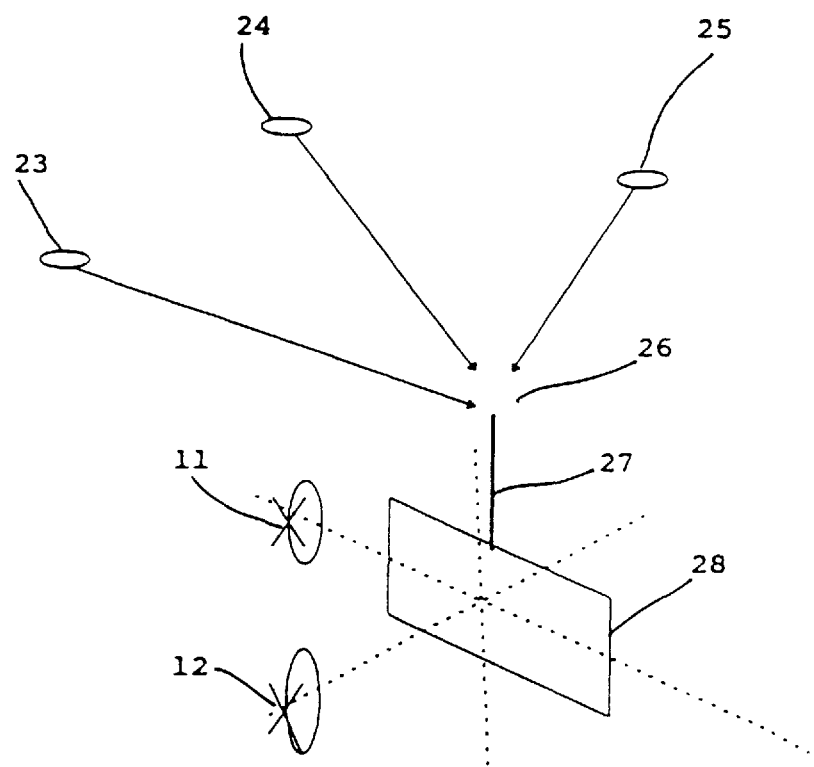
FIG. 2 shows a second embodiment of a system for monitoring movement of a blade of a bulldozer.

In the previous embodiment of the invention discussed in relation to FIG. 1 a tracking theodolite system was described. According to another embodiment of the invention as shown in FIG. 2 the tracking theodolite system could be replaced by a satellite navigation system which incorporates satellites 23, 24 and 25 and normally a base station at the work site (not shown) to track a beacon 26 located on top of a pole 27. The computer can then track the location of the blade using the satellite navigation system.

According to one embodiment combinations of GPS/ laser/inertial systems can be used.

If it is assumed that the bulldozer has not moved the images shown in FIG. 3 represent stored set up data in the computer. When the bulldozer moves the on board computer is continually radioed the new position of a point A relative to its own co-ordinate system and the on board transducers continually update the computer with the new tilt and direction data. The origin of the blade co-ordinate system (in the example plane A, B, C) as tracked by the theodolite moves in space. Point A is recorded by the theodolite and radioed to the computer. Point B and C are re-calculated from relativity changes to the set up data and therefore re-establishes the blades local co-ordinate system at point A. From this plane the chanced positions of points on the blade are re-calculated in true space and the image and position of the blade and the shadow on the terrain model is drawn.

In summary therefore the theodolite which has its own co-ordinate system with its origin set at 00,00,00measure point A as it moves in space. The origin of co-ordinates and axis system defined at set-up by plane ABC is calculated by the computer to be moving identically. The surveyed reference pegs which are identified in true space in the computer terrain model and in space relevant to the theodolite by the theodolite are used to locate the position of the theodolite in true space. All theodolite relative readings can then be converted to true readings from a point accurately identified in space. The plane A, B, C at set up establishes through software a co-ordinate system with its origin and axis correctly identified in space. Movement of the bulldozer moves this plane and hence the origin of co-ordinates of the blades co-ordinate system. The orientation of the set-up plane (the coordinate axis system at the pole reflector) remains fixed in space, as A moves and the new position of the co-ordinate system at A is re-calculated from data from the compass and tilt meters 11, 12, 13. This re-defines the plane A, B, C in space and hence through software points on the blade to draw the blade and shadow on the terrain model.

The true co-ordinates of point A are used to position the blade image correctly on the terrain model. Changes in compass readings are used to rotate the perspective view of the terrain model with respect to the blade image in phase with the change of view as seen by the operator through the front screen of the bulldozer. The change in the readings of the tilt meters are used to calculate the blades position with respect to point A (the origin of co-ordinates cf the blades axis system).

The formation of a terrain model of a work surface can be created by various means. Such as by surveying data points on the ground to a co-ordinate system that can be processed with readily available computer software programs to show a surface or 3-D model of the surveyed points on a computer screen. Another means of creating the terrain model is to take the surveyed data points and modify these points in various software programs to create a new surface.

As shown in FIG. 3 the terrain model is basically a surface formed from joining the points. The points which represent the blade are superimposed onto the display surface as the blade is also a series of points in the same co-ordinate system. The points of the blade can be compared with the points of the surface and from this comparison the computer can calculate the location of a blade shadow. This can then be displayed on the computer screen. Thus the intersection of vertical lines from the bottom of the blade and the surface model establishes points on the model. A line constructed through these points maps the shadow on the terrain model (the display surface).

The image of the blade on the screen is controlled by software to give it realistic proportions and position to the real blade and the forward panorama as viewed by the bulldozer operator.

In the embodiment described above with reference to FIG. 3, the shadow 22 is created from the bottom edge of the blade of the bulldozer. It is within the scope of this invention however to create a shadow for other edges of the bulldozer blade or whatever work tool is used in its place. As an example where a bulldozer blade is working at an angle, it may be preferable to project both the bottom and side edges of the blade onto a terrain model, thus giving a better picture of the actual location of the blade with respect to the model. Therefore according to one variation of the invention a full shadow of the whole working tool could be obtained, for example by using different coloured shadows for different edges of the working tool.

According to another embodiment of the invention, the work surface can be compared to a design surface and differences in height and colour coded to indicate the amount of cut or fill between the two surfaces. A neutral colour could be chosen for when the work surface matches the design surface and graduating extremes of colour could be used to indicate the depth or non-conformity for the non-matching surfaces. Management or the machine operator can then view the terrain model, see the areas where the work is completed and see the areas where earth movement is still required. The graduating colour system would allow management to view areas that have been undercut and by how much.

According to another aspect of the present invention the system allows the terrain model to be created dynamically and displayed on the computer screen or transmitted to external data loggers or computers.

Figure 5:
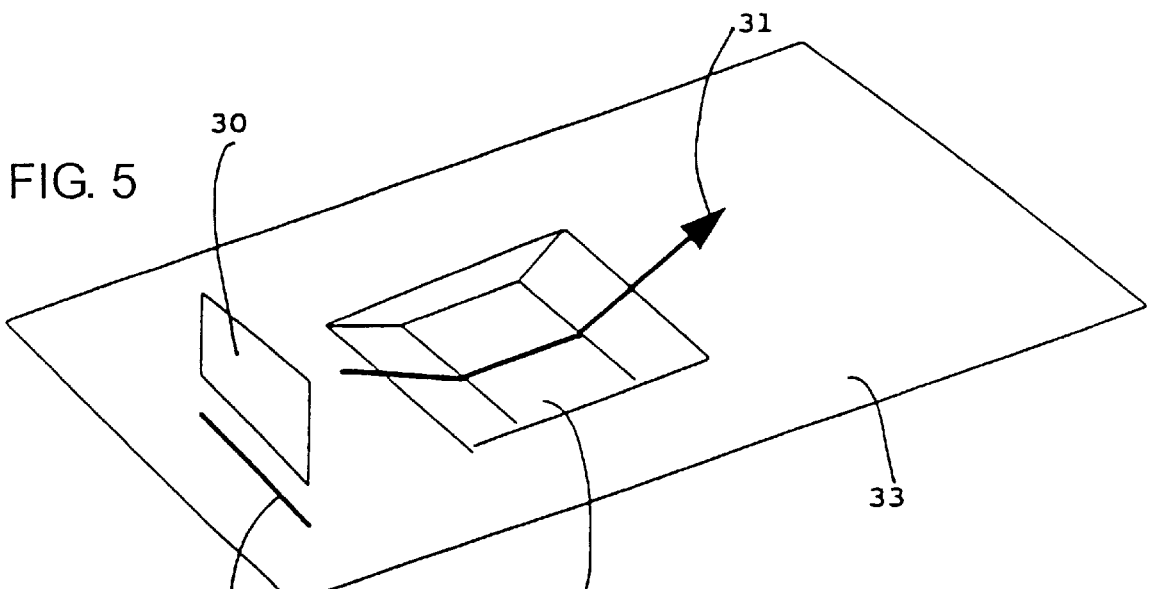
FIG. 5 shows a representation of an image of a dynamic surface model of a terrain.

Thus by comparing the surface points on the surface model beneath or above the blade points the processor can modify the surface points based on a combination of information from the blade points and software programs in the processor which would trigger or start the modification of the surface. Thus if the blade was lowered to cut below the level of the terrain surface, the computer having received the information on the co-ordinates of the blade would start to log the blade points path and software in the processor would start lowering the surface as the blade points pass. The software in the processor would also calculate the volume between the first surface and the new surface. This volume will also be part of a further change to the new surface as it is now a volume that must end up on top of the first surface or be carried away from the surface altogether. Thus as shown in FIG. 5 the blade 30 having moved along the path 31 would have created a recess 32 in the surface 33. Details of the characteristics (viscosity, density, angle of repose) of material which is removed from the surface 33 to form the recess 32 enables the computer to calculate the final shape of the recess 32 and allow the computer to be programmed to predict how this material will stack on top of the surface 33.

An accurate image of the changes to the surface 33 can be represented as shown in FIG. 5 on the computer screen.

Figure 6:
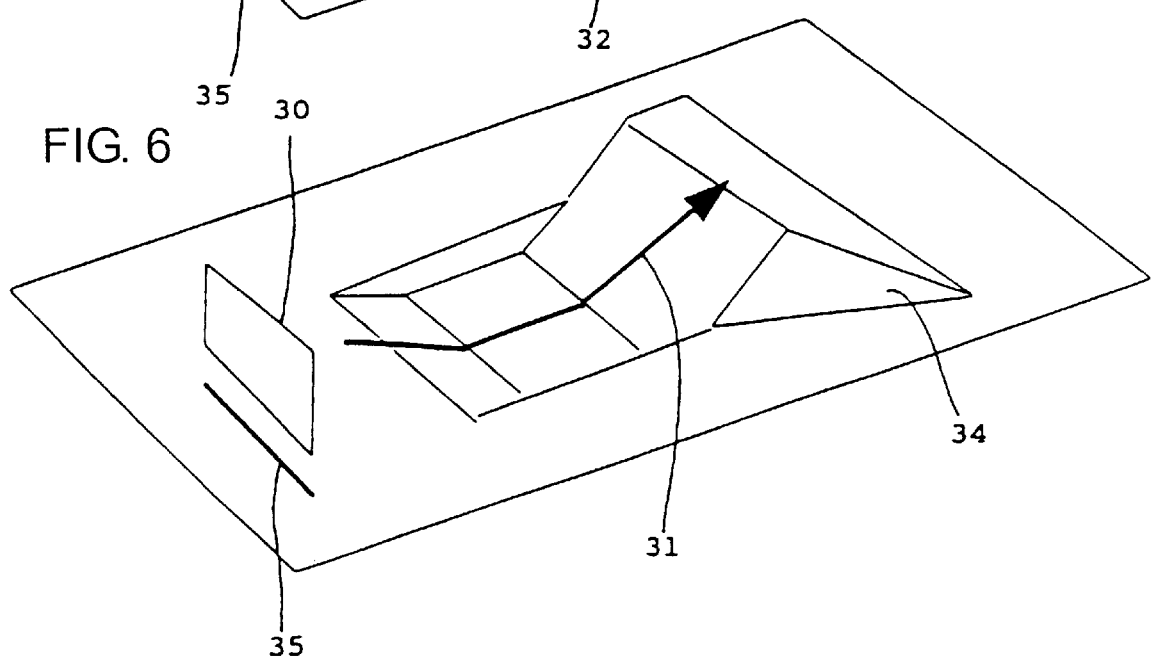
FIG. 6 shows a representation of an image of an altered surface of a topographical model.

If the material from the recess 32 is placed on the surface to form a pile 34 as shown in FIG. 6 the computer using information on the material can calculate the shape of the volume of the soil that is placed on top of the surface and hence establish a new surface which can be imaged on the computer screen in a similar fashion as shown in FIG. 6.

Whenever the blade 30 cuts below the surface 33 the lower surface of the blade 20 intersects the shadow 35. The bulldozer driver sees this on the computer screen and realises what effect this is having on the terrain model due to the continual updating of the terrain model by the computer.

It should be noted that no pre-defined surface is needed to create a surface image on the computer screen.

Figure 7:
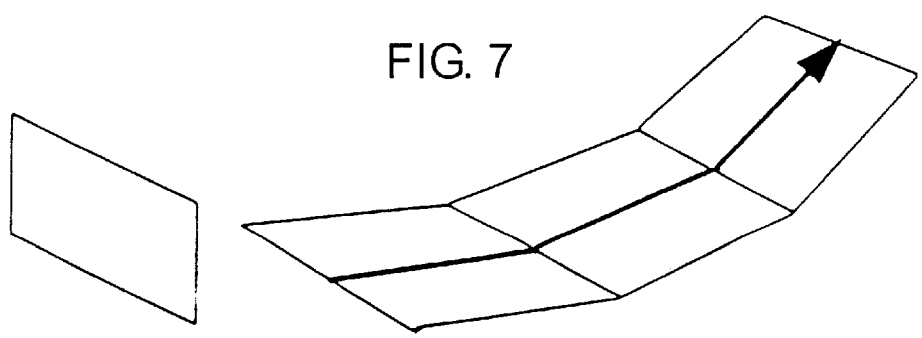
FIG. 7 shows a representation of an image of a dynamically updated topographical model.

Thus as shown in FIG. 7, as the blade points are logged into a co-ordinate system as a set of intervals and a surface is created from joining these points the model can be dynamically updated from the previous surface or logged on the pass of a particular path of the blade points to create a new terrain model.

Figure 10:
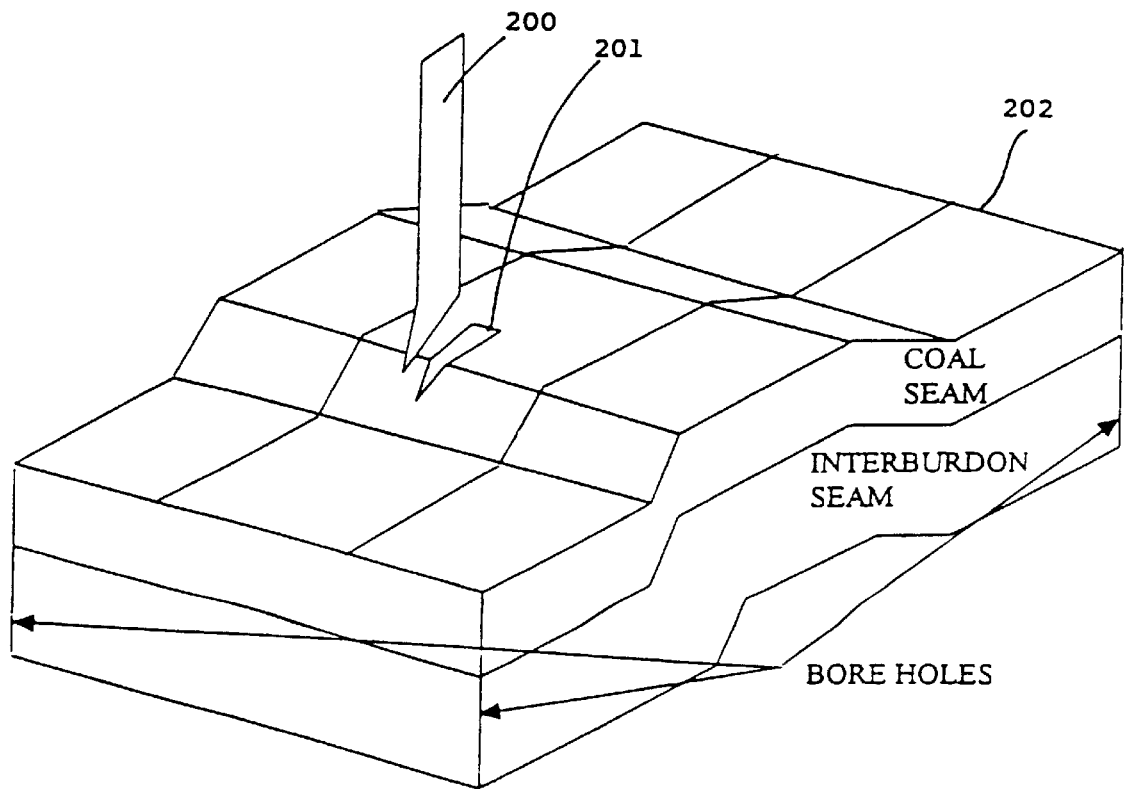
FIG. 10 shows an embodiment of the present invention wherein a ripper tine replaces the working tool.

According to another embodiment the bulldozer is replaced by a ripper tyne as the working tool. Thus as shown in FIG. 10 the terrain model 202 is provided and the ripper tyne 200 produces a shadow 201 which conforms to the surface of the terrain model 202.

In the embodiments described above it is preferable that data is only logged when the work tool is on the surface. Thus it would not be necessary to log data when a bulldozer blade is backing with the blade held above the ground. Thus in most cases when the bulldozer is working it would only be necessary to log data when the bulldozer is moving forward. This can be achieved with two GPS units logging movement as one would be on the front end of the machine and one on the back. With the tracking theodolite however there is no such mechanism. This can be achieved with transducers. For example acceleration data integrated over time. Alternatively a sensor can be attached to the machine control to sense direction or the operator can be provided with a switch when it is desired to record data.

If a GPS system is adopted, besides the GPS receivers mounted on the mobile machine, a stationary ground based GPS receiver may sometimes be used in what is called differential GPS to improve accuracy.

According to one embodiment of the invention a ground penetrating radar his located on the bulldozer and sends radar pulses into the surface beneath the machine or blade. The data received back shows the density differences in the materials as it passes through. The computer receives information from the radar on the differences in the materials in the soil and thus the change in densities between the different materials can be identified. The change in density can be processed to give a surface between two different density materials.

Thus, by placing a radar on board the machine, surfaces beneath the machine can be logged referencing the blade's or machines co-ordinate's. This information can be used to give dynamically updated and hence more accurate representations of the topography of the underground terrain model.

Figure 8:
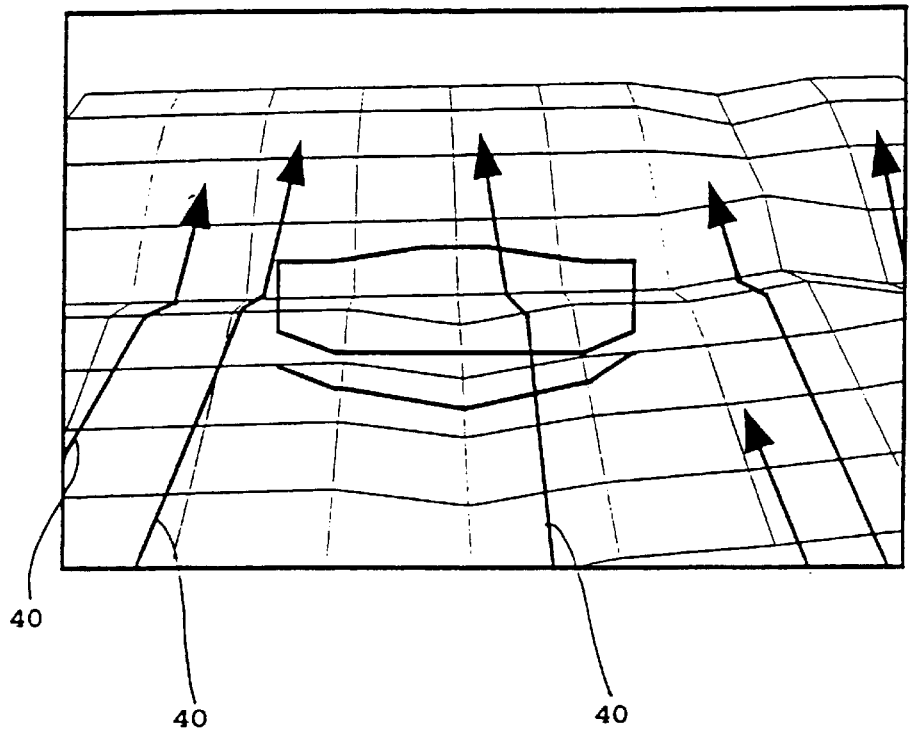
FIG. 8 shows a driver display of a path for a blade of a bulldozer in a mine rehabilitation model according to a second embodiment of the invention.

According to another aspect of the present invention, information on the path a bulldozer should take can be displayed on the computer screen. As shown in FIG. 8 arrows 40 can indicate the direction in which the blade should move. In other words a how-to-do or procedure can be incorporated into the displays of both the static surface and the dynamic surface as required. Thus the computer would be programmed using software designed to work out the most cost effective path to transport volumes of material to achieve a desired surface. As the surface which is to be the final surface will be different from the actual surface these programs show the path a bulldozer should follow in transporting particular volumes of material. Each arrow 40 shown in FIG. 8 would represent a path to follow. The start of the arrow would indicate where the volume is to be transported from and the end of the arrow would show where the volume is to be transported to.

Using an optimisation algorithm two terrain models can be compared such as the starting or actual surface model and the finished or desired surface model. The difference in volumes between the two models is divided into cut and fill as appropriate. These volumes can be sub-divided into blocks of any pre-determined size and identified in the models. The computer is then operated using the algorithms to determine which block in the cut volume should go to which space in the fill volume within the constraints. If it is desired to minimise the total accumulative distance travelled of all the blocks an arrow can be assigned to a block the end of which indicates the cut block to be moved and the arrow head the destination. Because the location of the blade can be continually monitored the terrain model can be continually updated and the computer can be operated using optimisation algorithms to produce new path indicators in the form of arrows 40 as work progresses. According to another embodiment the progression of arrows can be provided in a hierarchal structure so that the driver of the bulldozer knows which path should be taken first. In such an instance the computer is continually processing information on the movement of the blade calculating its distance from the surface below it, processing information on the path of the blade to provide an updated version of the terrain model and using information input on the optimum path the blade should take to produce directional indicators on the computer screen.

Because the computer is operating using a co-ordinate system to determine the location of the blade, the shadow and model terrain the image of the arrows will also be generated in the same co-ordinate system and can be converted and displayed in the co-ordinate system used with the surface points and blade points placing the arrow overlay onto the surface.

The data displayed may also be transmitted to a control station for analysis. Data may also be transmitted from the control station to the bulldozer.

The above embodiments have been described in relation to a mining site using bulldozers to move mined material. The present invention is equally applicable to systems involving reclamation of spoil piles, ripping and stripping of thin partings and seams, ripping of cap rock, paving, airport run-way construction, dynamic surveying, removal of overburden, general road works, laying of communication cables, port construction and volume calculations. As such any number of ground engaging tools or machines can be employed in the above system. These for example include blades, ripper tynes, bucket wheels, face shovels, excavators, draglines, wheel loaders, etc.

The work tool need not be a cutting tool. For example the work tool could be the paint spray nozzle on a road marking machine.

According to the preferred embodiment the image of the tool remains in the centre of the computer screen as the earth moving machine travels through the computer model. This gives the operator a realistic view of the terrain model.

It is possible to have the computer in a place other than the bulldozer and to transmit a video image to a receiver on the bulldozer. A suitable displaying device can then be inserted in the cabin of the bulldozer.

As previous described the tracking theodolite can be replaced by a GPS receiver or a combination of GPS and laser methods. For example, GPS can be used to identify horizontal position and lasers to identify vertical height. If two GPS receivers are positioned on the dozer they can replace the compass 13. Any position measuring device such as a GPS unit can be used to log the co-ordinate points on the blade to establish the blade profile and its local co-ordinate system.

The above embodiment can be modified to increase the number of indicators on the ground excavating tool. By adding more transducers or new sensors or other indicators more accurate information on the precise location of the tool in space can be relayed to the computer. Thus for a backhoe arm, because there are more moving components, more indicators would be required to identify the location of these components.

If the above system is applied to other machinery such as an excavator, on the excavator the tracking reflector or GPS units cannot be attached to the digging tool. There will be a number of mechanical elements linking the digging tool to the base unit carrying the reflector or GPS. Transducers are required to measure the movements of these links. This data and the lengths between hinge points on the links will be needed by the software to calculate the position of the tool in space. The lengths of these links can be measured and logged in the software using the same methods described to draw the blade in the bulldozer application.

According to another embodiment of the present invention the images displayed on the commuter screen are represented in numerical or analogue form. Alternatively bar graphs or graphical images can be employed.

According to a further embodiment a number of vehicle tools can be monitored on the display of one vehicle.

According to another embodiment a number of tools on one vehicle can be monitored by being displayed on the screen. Thus a bulldozer switching between a ripper tyne and a blade can monitor the operation of both by observing their images on the screen. When one of the tools is being operated the other tool can have its image removed from the screen.

I claim:

1. A method for monitoring a vehicle tool comprising
   inputting tool data indicative of a location of at least a part of the vehicle tool to a data processor,
   inputting model data to the data processor on a model zone in which the vehicle tool is to operate,
   operating the data processor to compare the vehicle tool location with the model zone,
   outputting from the data processor to a display means, data indicative of a difference in location between the vehicle tool and an adjacent surface of the model zone, and
   displaying on the display means an image of the model zone, a representation of a part of the vehicle tool and a visual representation of an actual distance of the part of the vehicle tool to the adjacent surface of the model zone.

2. The method for monitoring a vehicle tool as claimed in claim 1, wherein the part of the vehicle tool comprises a bottom edge of the vehicle tool.

3. The method for monitoring a vehicle tool as claimed in claim 1, wherein the representation of the distance between the part of the vehicle tool and the adjacent surface comprises an image representing a shadow of the part of the vehicle tool on the adjacent surface.

4. The method as claimed in claim 3, wherein the model zone represents a desired end result after reshaping by the vehicle tool.

5. The method as claimed in claim 4, wherein the model data comprises a plurality of co-ordinate points referenced to a three-dimensional co-ordinate system.

6. The method as claimed in claim 4, wherein the tool data comprises co-ordinates of said at least a part of the vehicle tool in a three-dimensional co-ordinate system.

7. The method as claimed in claim 6, wherein the tool data comprises data on a location of a point on the body of a vehicle separate from the vehicle tool.

8. The method as claimed in claim 7, including the steps of tracking the location of the vehicle tool using a tracking means and relaying tool data to the data processor.

9. The method as claimed in claim 1, including the steps of processing input tool data over a predetermined period to produce path data on a path travelled by the vehicle tool, comparing the path data with model zone data, producing revised model zone data, outputting the revised model zone data to the display means, displaying on the display means a revised model zone including a representation of a modification to the part of the model zone corresponding to the oath travelled by the vehicle tool.

10. The method as claimed in claim 9, wherein the revised model zone data is produced by comparing the path data with shadow data, which includes data on a distance the vehicle tool extends above and below the adjacent surface over a predetermined period.

11. The method as claimed in claim 10, including the step of calculating the volume of space above or below the path of the model zone corresponding to the path travelled by the vehicle tool over the predetermined period.

12. The method as claimed in claim 11, including the step of processing the calculated volume of space with parameters relating to a material filling the volume of the space to produce an estimate of a resultant profile of the model zone effected by movement of the vehicle tool over the predetermined period.

13. The method as claimed in claim 12, wherein the parameters relating to the material filling the volume of space include viscosity and density and angle of repose.

14. The method as claimed in claim 13, including the step of processing the calculated volume of space with parameters relating to the material filling the volume of space to provide an estimate of a location of the material at the end of the predetermined period and an estimate of a resultant profile of the model zone.

15. The method as claimed in claim 9, wherein the display means comprises two screen images, a first screen image displaying the image of the model zone, the image of the vehicle tool and the visual representation of the actual distance of the part of the vehicle tool to the adjacent surface and the second screen showing the image of the revised model zone.

16. The method as claimed in claim 1, wherein the model data is processed to produce future path data which is output to the display means and the display means is arranged to display on the image of the model zone an indication of the path a vehicle tool should follow to complete an operation.

17. The method as claimed in claim 16, wherein the display means shows the indication of the path the vehicle tool should follow by a pointer.

18. The method as claimed in claim 17, comprising a step of operating the data processor using an optimisation algorithm to calculate a future path and comparing model data at one time with model data at a later time to produce the future path.

19. The method as claimed in claim 1, wherein the model zone comprises a surface model of a terrain or a boundary of an ore body, including the step of calculating the volume of a solid bounded by the surface model at regular time intervals, calculating the difference in volumes between solids bounded by consecutive surface models and displaying a representation of a difference in volumes between consecutive surface models.

20. The method as claimed in claim 19, wherein the volume of the solid calculated is subdivided into a plurality of blocks which are defined by grids in the surface model, the method further comprising displaying an image of the plurality of volume blocks on the display means.

21. A system for monitoring movement of a vehicle tool in a model zone comprising a position indicator for indicating a location of a vehicle tool, an orientation indicator for indicating an orientation of the vehicle tool, tracking means for tracking the position indicator and orientation indicator, tracker means for transmitting signals indicative of the location of the vehicle tool and the orientation of the vehicle tool, display means for a location on the vehicle for the vehicle tool, wherein the display means is arranged to display a representation of the vehicle tool in a model zone and a representation of a shadow of the vehicle tool cast on the model zone, and a data processor for receiving signals transmitted by the tracker means and for processing the signals with data representing a model zone for outputting data to the display means which data enables the display means to display a representation of the vehicle tool and an image of the model zone and a representation of the shadow cast by the vehicle tool on the model zone.

22. The system as claimed in claim 21, wherein the data processor processes received signals representing the location of the vehicle tool to establish image data representing a shape and position of the vehicle tool.

* * * * *